(12) United States Patent
Chang et al.

(10) Patent No.: US 12,461,301 B2
(45) Date of Patent: Nov. 4, 2025

(54) BACKLIGHT MODULE INCLUDING POSITION LIMITING UNIT AND REFLECTIVE SHEET WITH BENDABLE PORTION AND DISPLAY DEVICE INCLUDING THE SAME

(71) Applicant: Radiant Opto-Electronics Corporation, Kaohsiung (TW)

(72) Inventors: Cheng-Te Chang, Kaohsiung (TW);
Jing-Hu Jheng, Kaohsiung (TW);
Pei-Fen Hou, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 18/922,866

(22) Filed: Oct. 22, 2024

(65) Prior Publication Data

US 2025/0116808 A1  Apr. 10, 2025

Related U.S. Application Data

(63) Continuation of application No. PCT/CN2023/129683, filed on Nov. 3, 2023.

(51) Int. Cl.
*F21V 8/00* (2006.01)
*G02F 1/1333* (2006.01)
*G02F 1/1335* (2006.01)

(52) U.S. Cl.
CPC ......... *G02B 6/0055* (2013.01); *G02B 6/0088* (2013.01); *G02F 1/133314* (2021.01); *G02F 1/133524* (2013.01)

(58) Field of Classification Search
CPC ............... G02B 6/0055; G02B 6/0088; G02F 1/133314; G02F 1/133524
See application file for complete search history.

(56) References Cited

U.S. PATENT DOCUMENTS

| 2003/0179566 A1* | 9/2003 | Ito | G02B 6/0055 362/330 |
| 2003/0179580 A1* | 9/2003 | Ito | G02B 6/009 362/306 |

(Continued)

FOREIGN PATENT DOCUMENTS

| CN | 102913862 | 2/2013 |
| CN | 114935852 | 8/2022 |

(Continued)

*Primary Examiner* — Keith G. Delahoussaye
(74) *Attorney, Agent, or Firm* — BACON & THOMAS, PLLC

(57) ABSTRACT

The present invention provides a backlight module having a backplate, a position-limiting unit, a reflective sheet, a light guiding plate, and a light-emitting unit. The position-limiting unit is disposed on the backplate and has a position-limiting surface, a guiding surface, and a gap. The reflective sheet is disposed on the backplate and has a first side edge, a second side edge, a cutting line extending inward from the first side edge, and a bendable portion formed between the cutting line and the second side edge. The bendable portion abuts the position-limiting surface of the position-limiting unit and is guided by the guiding surface to extend into the gap as the reflective sheet expands along the position-limiting surface. The present invention also provides a display device having aforementioned backlight module and a display panel.

11 Claims, 7 Drawing Sheets

(56) References Cited

U.S. PATENT DOCUMENTS

| | | |
|---|---|---|
| 2013/0293788 A1 | 11/2013 | Shimizu |
| 2014/0049719 A1 | 2/2014 | Yu et al. |
| 2014/0132884 A1* | 5/2014 | Yu .................. G02F 1/133524 349/62 |

FOREIGN PATENT DOCUMENTS

| | | |
|---|---|---|
| CN | 115291433 | 11/2022 |
| CN | 115291435 | 11/2022 |
| CN | 116819673 | 9/2023 |
| CN | 116819673 A * | 9/2023 |
| JP | 2016110692 | 6/2016 |
| TW | M474935 | 3/2014 |
| WO | 2023103172 | 6/2023 |

* cited by examiner

BACKLIGHT MODULE INCLUDING POSITION LIMITING UNIT AND REFLECTIVE SHEET WITH BENDABLE PORTION AND DISPLAY DEVICE INCLUDING THE SAME

CROSS-REFERENCE TO RELATED APPLICATIONS

This application is a continuation application of international Application No. PCT/CN2023/129683 filed on Nov. 3, 2023, which claims priority from China Patent Application Serial Number 202311288606.5, filed on Oct. 7, 2023. The entire contents of each of which are incorporated herein by reference.

BACKGROUND OF THE INVENTION

1. Field of the Invention

The present invention relates to a backlight module and a display device, and particularly to a backlight module which prevents optical quality from being harmed by thermal expansion and a display device applied with the backlight module.

2. Description of Related Art

A conventional side-type backlight module has a backplate, a light-emitting unit, a light guiding plate, and a reflective sheet. The light-emitting unit is disposed to the backplate and located on a light-incident side. The reflective sheet is disposed on the backplate. The light guiding plate is disposed on the reflective sheet and receives light from the light-emitting unit.

The components of the conventional side-type backlight module are designed with dimension allowance for potential manufacturing and assembly tolerances. Also, at room temperature, a side of the reflective sheet near the light-incident side should extend beneath the light-emitting unit to ensure a good performance of the light reflection.

However, when the conventional side-type backlight module is under a high temperature environment, the reflective sheet may abut on other components and be deformed due to thermal expansion, such that optical quality of the side-type backlight module may be harmed. If reducing the original dimension of the reflective sheet, a gap between the reflective sheet and the light-emitting unit will increase, and the reflective sheet may fail to extend beneath the light-emitting unit at room temperature, which also harms the optical quality and causes optical loss.

SUMMARY OF THE INVENTION

The main objective of the present invention is to provide a backlight module and a display device, wherein the backlight module accommodates the expansion or contraction of a reflective sheet and maintains a position-limiting function for the reflective sheet. Harm to optical quality caused by thermal expansion of the reflective sheet is thereby prevented, and the optical quality can comply with standards through tests.

The backlight module is defined an abutting direction and comprises a backplate, a position-limiting unit, a reflective sheet, a light guiding plate, and a light-emitting unit. The backplate has a carrying surface. The position-limiting unit is disposed on the carrying surface of the backplate and has a position-limiting surface and a guiding surface connected with each other, and a gap being adjacent to the guiding surface. The reflective sheet is disposed on the carrying surface of the backplate and has a first side edge, a second side edge, a cutting line extending inward from the first side edge, and a bendable portion formed between the second side edge and the cutting line and abutting against the position-limiting surface of the position-limiting unit. The light guiding plate is disposed on the reflective sheet. The light-emitting unit is disposed on a side of the light guiding plate. As the reflective sheet expands along the abutting direction, the bendable portion of the reflective sheet extends into the gap of the position-limiting unit along the guiding surface of the position-limiting unit.

In normal statement, such as normal temperature, the reflective sheet of the backlight module in accordance with the present invention is positioned by abutting against the position-limiting surface of the position-limiting unit. As the reflective sheet expands, the bendable portion extends into the gap of the position-limiting unit along the guiding surface of the position-limiting unit to prevent a light-emitting surface of the reflective sheet from deforming. Also, there is no need to reserve an interval on an end of the reflective sheet near the light-emitting unit for potential expansion of the reflective sheet, which ensures optical quality and optical stability of the backlight module and prevents optical loss. The cutting line of the reflective sheet ensures the bendable portion to bend and extend into the gap of the position-limiting unit when the reflective sheet expands. The gap of the position-limiting unit allows the reflective sheet to have a greater expansion or contraction range and expands manufacturing and assembly tolerances of the components of the backlight module. Convenience of manufacturing and assembling is thus improved.

The display device in accordance with the present invention comprises the aforementioned backlight module and a display panel. The display panel is disposed on a side of the light guiding plate away from the backplate.

Applied with the aforementioned backlight module, the display device in accordance with the present invention prevents its optical quality from being harmed by expansion or shifting of the reflective sheet. Thereby, the display device maintains better optical quality, prevents optical loss, and is applicable in in-vehicle devices applied with the side-type backlight module.

DETAILED DESCRIPTION OF THE PREFERRED EMBODIMENT

Figure 1:
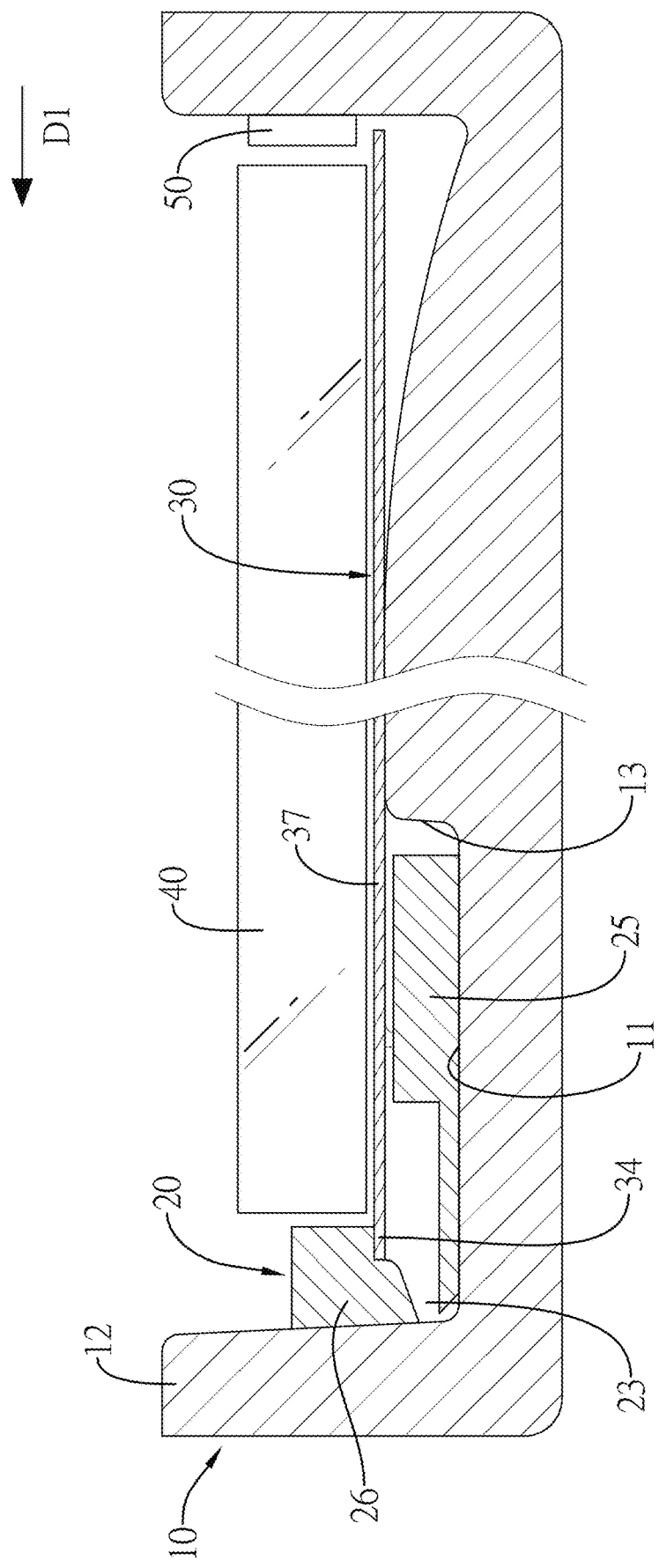
FIG. 1 is a partial sectional side view of a preferred embodiment of a backlight module in accordance with the present invention before a reflective sheet of the backlight module expanding.

With reference to FIG. 1, a preferred embodiment of a backlight module in accordance with the present invention defines an abutting direction D1 and backlight module has a backplate 10, a position-limiting unit 20, a reflective sheet 30, a light guiding plate 40, and a light-emitting unit 50.

Figure 2:
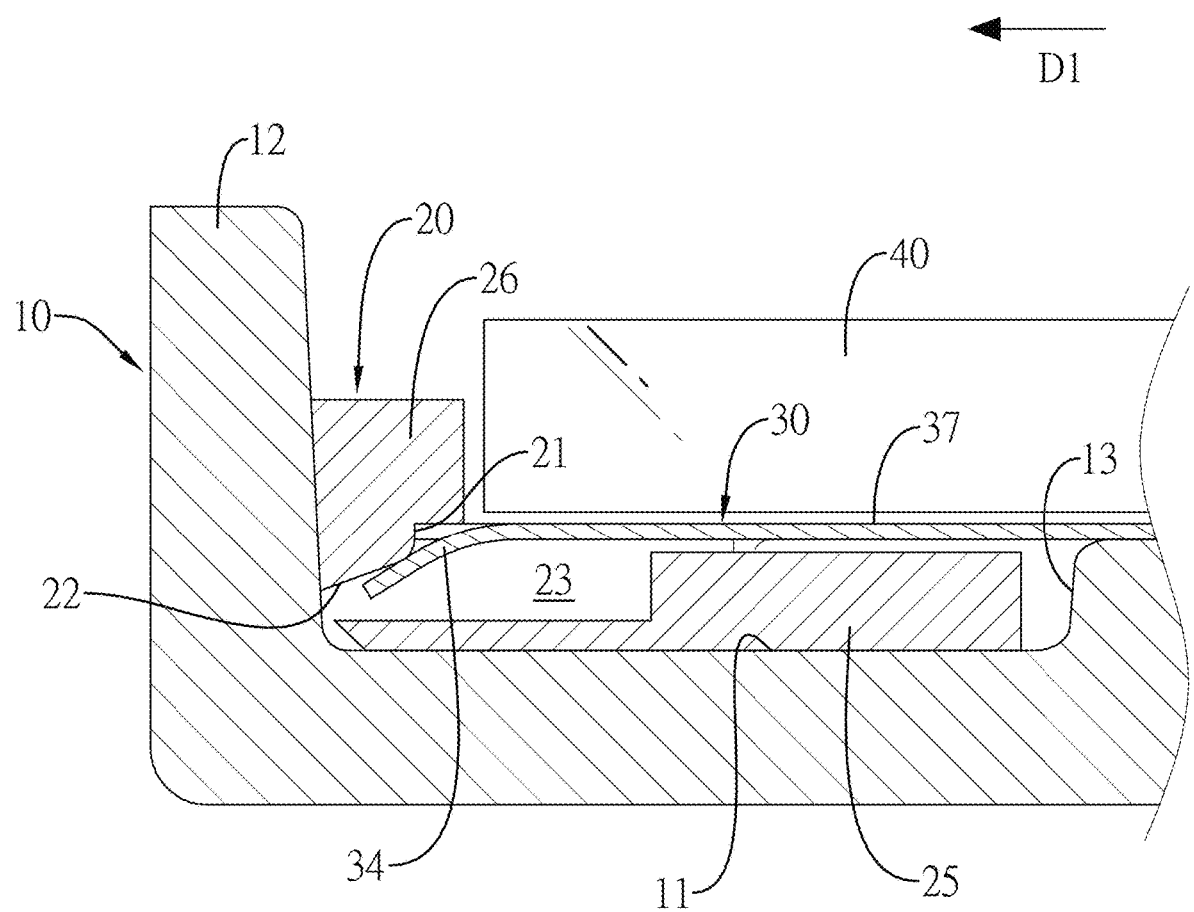
FIG. 2 is a partial sectional side view of the backlight module in FIG. 1 after the reflective sheet expanding.

With reference to FIGS. 1 and 2, the backplate 10 has a carrying surface 11, and the position-limiting unit 20 is disposed on the carrying surface 11 of the backplate 10. The position-limiting unit 20 has a position-limiting surface 21 and a guiding surface 22 connected with each other, and a gap 23 being adjacent to the guiding surface 22. The reflective sheet 30 is disposed on the carrying surface 11 of the backplate 10, and the light guiding plate 40 is disposed on the reflective sheet 30. The light-emitting unit 50 is disposed on a side of the light guiding plate 40.

Figure 4:
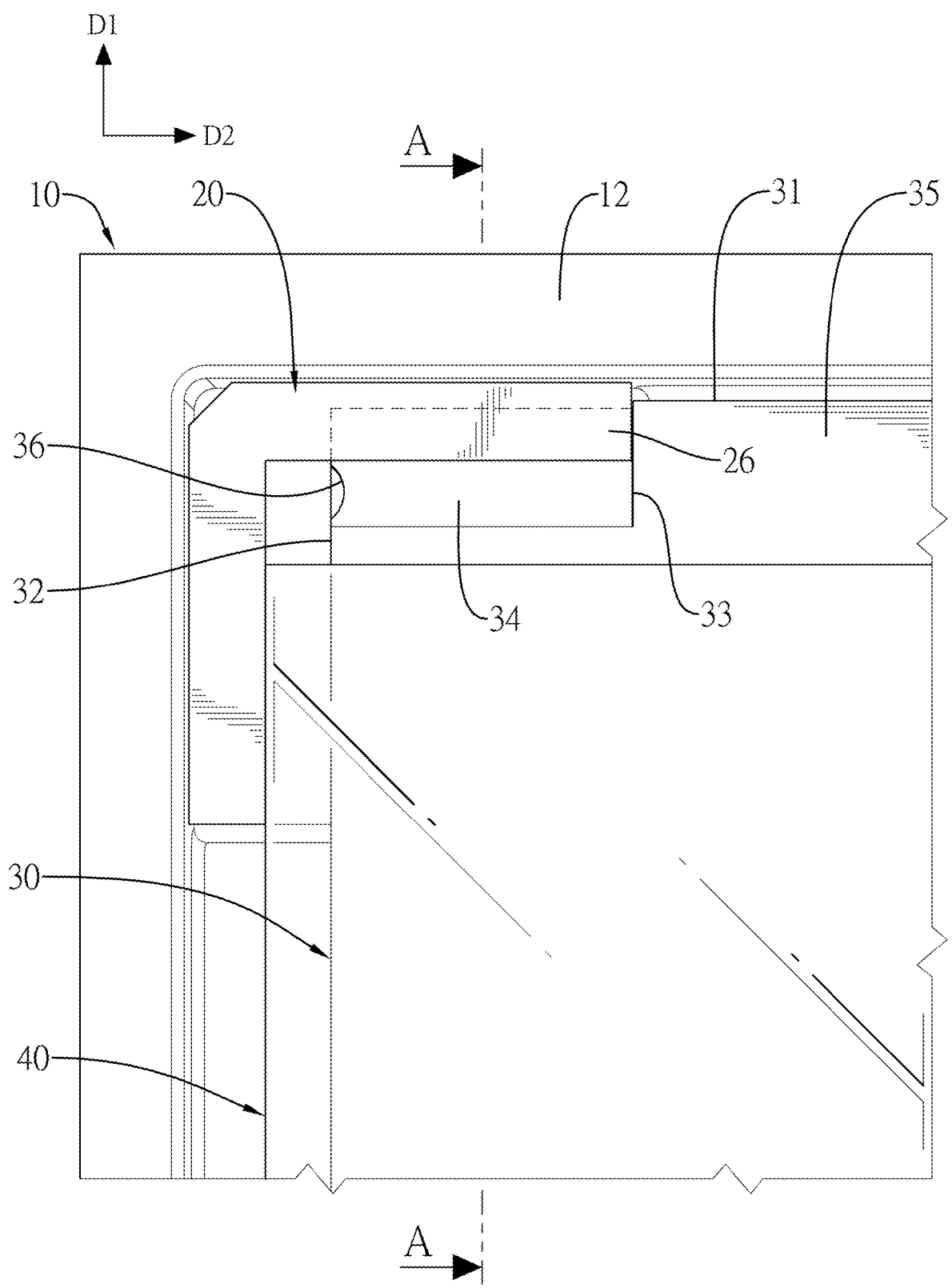
FIG. 4 is a partial top side view of the backlight module in FIG. 1.

With reference to FIG. 4, the reflective sheet 30 has a first side edge 31, a second side edge 32, a cutting line 33, and a bendable portion 34. The cutting line 33 extends inward from the first side edge 31, and the bendable portion 34 is formed between the cutting line 33 and the second side edge 32. With reference to FIG. 1, the bendable portion 34 abuts against the position-limiting surface 21 of the position-limiting unit 20. With reference to FIGS. 1 and 2, as the reflective sheet 30 expands along the abutting direction D1, the bendable portion 34 extends into the gap 23 of the position-limiting unit 20 along the guiding surface 22. The light-emitting unit 50 is configured to emit light toward the light guiding plate 40, and the reflective sheet 30 is configured to reflect the light toward the light guiding plate 40.

When the backlight module in accordance with the present invention is in normal statement with original dimension, e.g., at room temperature, which expansion or contraction haven't occurred, the reflective sheet 30 abuts against the position-limiting surface 21 of the position-limiting unit 20 to limit its position. Also, with reference to FIG. 1, an end of the reflective sheet 30 near the light-emitting unit 50 extends beneath the light-emitting unit 50. Thereby, the reflective sheet 30 is able to extend from the first side edge 31 to an opposite side edge, and the reflecting surface can be ensured to be flat for maintain optical quality of the backlight module. With reference to FIGS. 2 and 4, when the reflective sheet 30 expands, the bendable portion 34 is configured to extend into the gap 23 of the position-limiting unit 20 along the guiding surface 22. Thereby, a light-emitting surface of the reflective sheet 30 is prevented from deforming during expansion, and there is no need to reserve an interval on the end of the reflective sheet 30 near the light-emitting unit 50 for the expansion. The optical quality and optical stability of the backlight module can thus be ensured, and optical loss can also be prevented to maintain luminous efficiency. The cutting line 33 of the reflective sheet 30 ensures the bendable portion 34 to bend and extend into the gap 23 of the position-limiting unit 20 when the reflective sheet 30 expands.

Moreover, manufacturing and assembly tolerance of each component of the backlight module is also put into consideration. By the coordination of the reflective sheet 30 and the position-limiting unit 20, when assembling the backlight module, the tip is to make the end of the reflective sheet 30 near the light-emitting unit 50 extending beneath the light-emitting unit 50. The bendable portion 34 of the reflective sheet 30 may either be flat to abut against the position-limiting surface 21 or bend already to extend into the gap 23 of the position-limiting unit 20. No matter if the bendable portion 34 bends or not, the bendable portion 34 is configured to extend into the gap 23 from outside the gap 23 or further extend into a depth of the gap 23 when the reflective sheet 30 expands. Thereby, the gap 23 provides a greater expansion or contraction range for the reflective sheet 30 to expand and for a greater manufacturing and assembly tolerances of the components in the backlight module. Convenience of manufacturing and assembling is thus improved.

Besides, in an embodiment of the backlight module, the end of the reflective sheet 30 near the light-emitting unit 50 is not fixed to the backplate 10 via tape or other components and is thus a free end. The bendable portion 34 is located on the other end of the reflective sheet 30. At room temperature, the reflective sheet 30 abuts against the position-limiting element 20 to limit its position, so the free end of the of the reflective sheet 30 extends beneath the light-emitting unit 50 and is prevented from shifting. The optical quality of the backlight module can thus be ensured. When the reflective sheet 30 expands, by the bendable portion 34 extending into the gap 23, most of the expansion of the reflective sheet 30 occurs on the bendable portion 34. Although the free end of the reflective sheet 30 expands under the light-emitting unit 50, however, if the free end of the reflective sheet 30 abuts other components and cannot expand anymore, the bendable portion 34 continues extending into the gap 23. Thereby, deformation of the light-emitting surface of the reflective sheet 30 can be effectively prevented.

Figure 3:
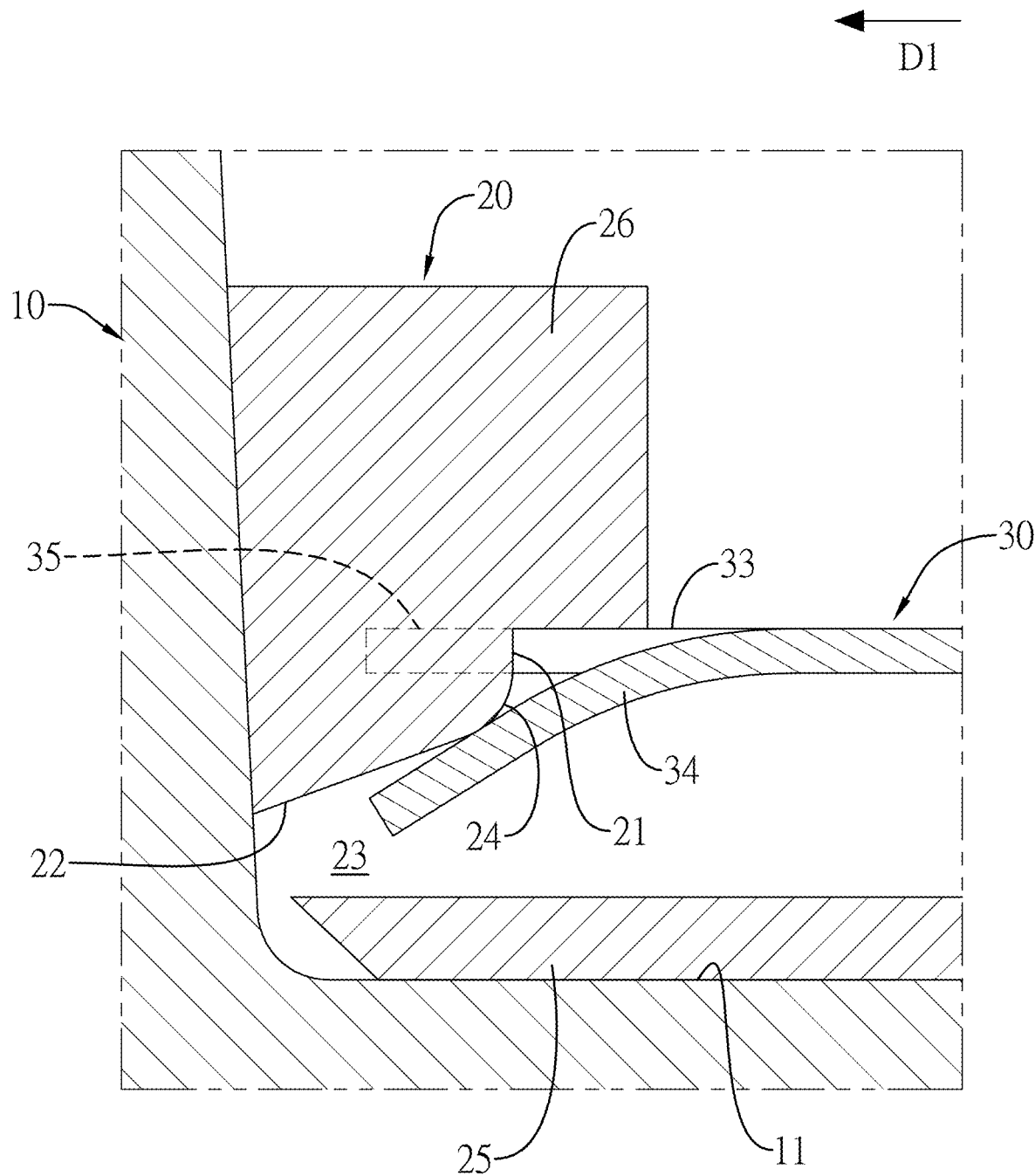
FIG. 3 is an enlarged view of FIG. 2.

Additionally, with reference to FIG. 3, the position-limiting surface 21 and the guiding surface 22 are connected via an arc section 24. If the bendable portion 34 moves along the abutting direction D1 due to the expansion of the reflective sheet 30, the bendable portion 34 is configured to move from the position-limiting surface 21 to the guiding surface 22 along the arc section 24. That is, the arc section 24 reduces a resistive force to the movement of the bendable portion 34, which prevents the bendable portion 34 from being obstructed.

Figure 5:
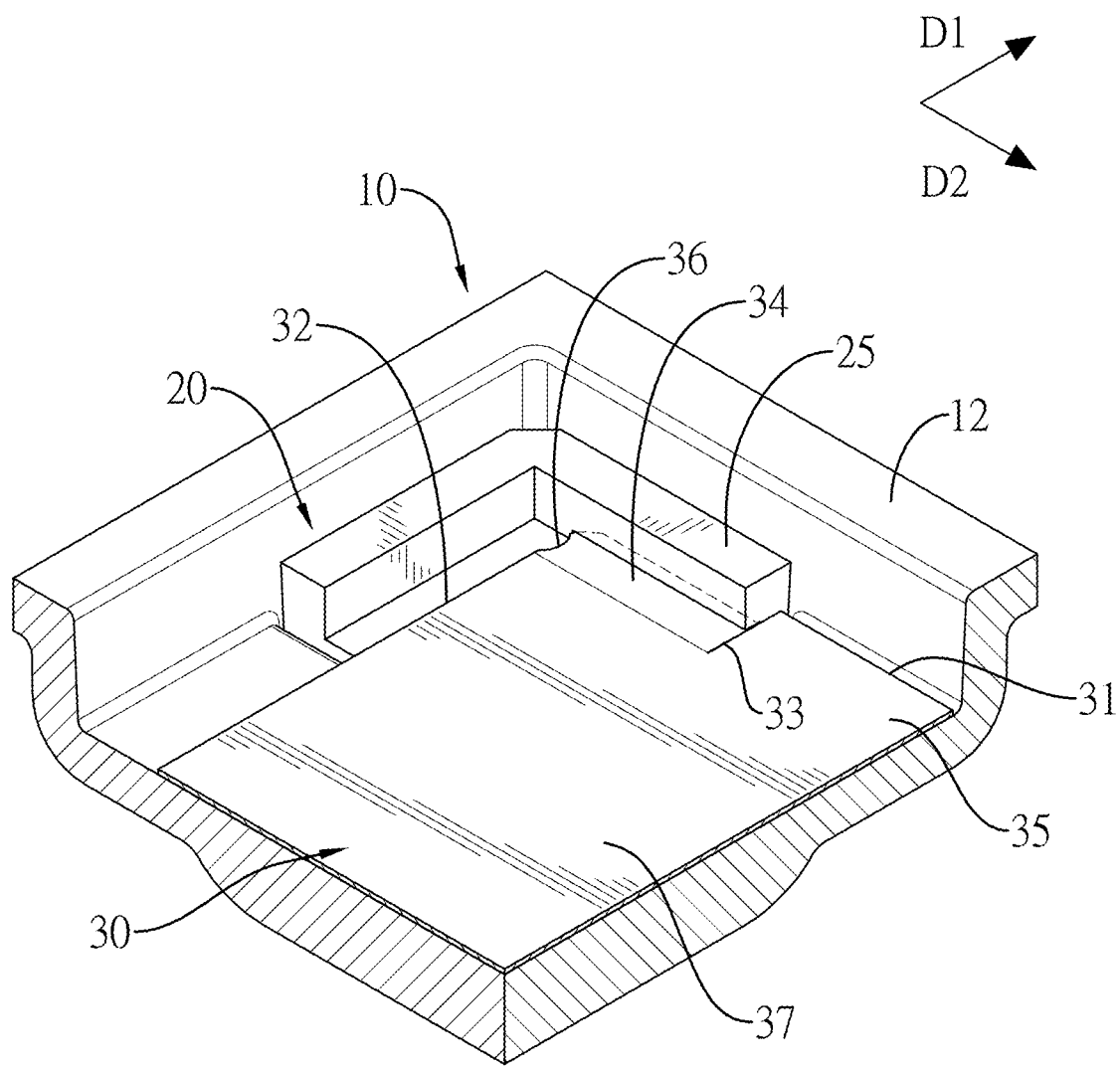
FIG. 5 is a partial perspective view of a backplate, a position-limiting unit, and a reflective sheet of the backlight module in FIG. 1.
Figure 6:
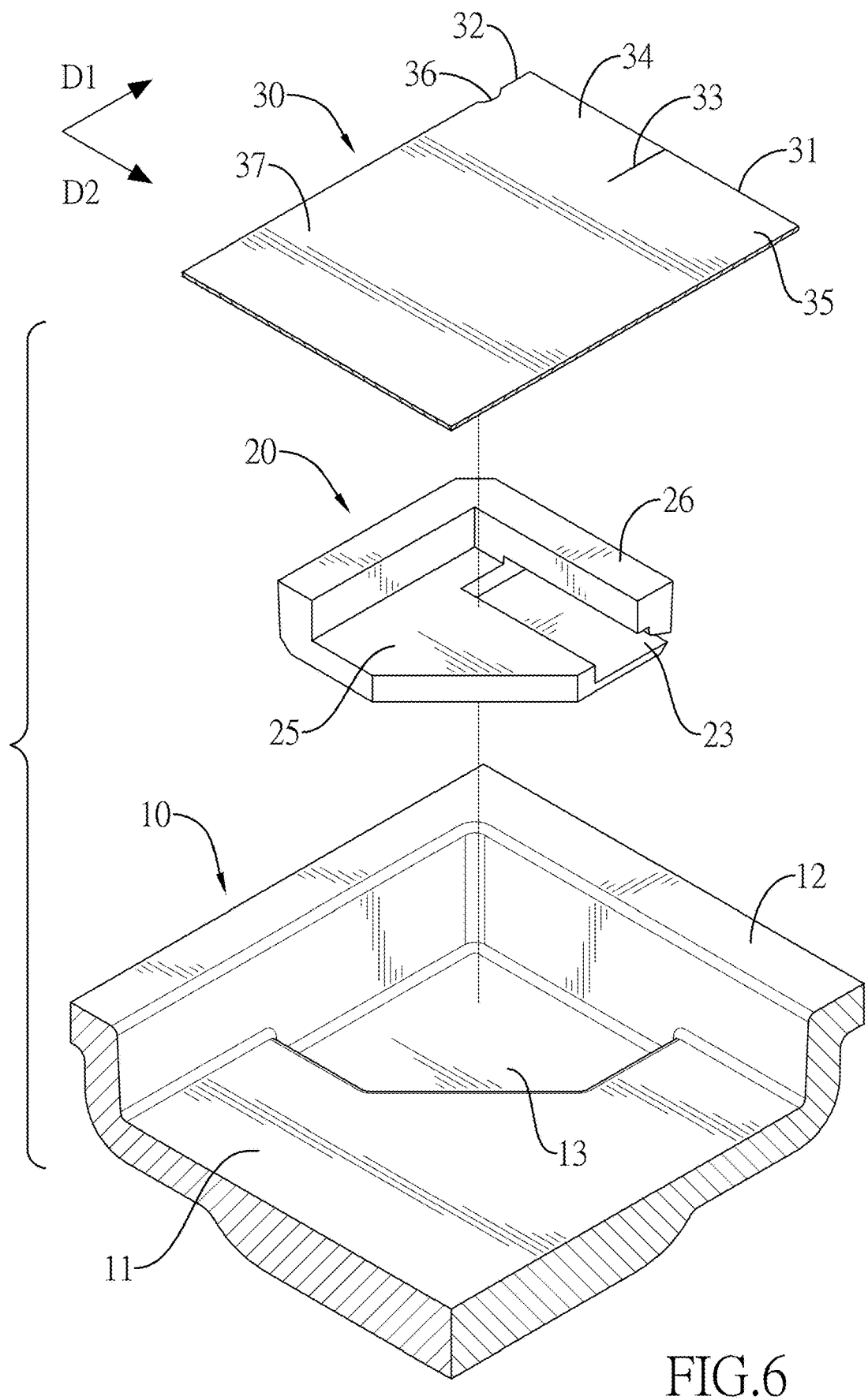
FIG. 6 is an exploded view of the backplate, the position-limiting unit, and the reflective sheet in FIG. 5.

With reference to FIGS. 4 to 6, the cutting line 33 is located outside and near the position-limiting unit 20, which allows a widthwise edge of the bendable portion 34 along a lateral direction D2 to be approximately aligned with a side edge of the position-limiting unit 20. Thence, the bendable portion 34 has an appropriate structural strength and is neither too narrow to provide enough abutting force nor too wide to bend. Further, the reflective sheet 30 has an extending portion 35 connected to the first side edge 31. The cutting line 33 is formed between the bendable portion 34 and the extending portion 35, and the extending portion 35 and the position-limiting unit 20 have no contact with each other. The extending portion 35 and the bendable portion 34 are separated by the cutting line 33. Therefore, when the reflective sheet 30 expands, the bendable portion 34 is located above the gap 23 without being supported by the position-limiting unit 20, and the bendable portion 34 thus bends easily. In addition, the extending portion 35 is located above and supported by the carrying surface 11 of the backplate 10 when the reflective sheet 30 expands. Thereby, the extending portion 35 is prevented from being bent by the bendable portion 34 and remains flat individually. The extending portion 35 thus reflects light as usual. Since the cutting line 33 is located near the position-limiting unit 20, a width of the extending portion 35 along the lateral direction D2 can be maintained as long as possible to improve efficiency of light reflection of the extending portion 35 and the luminous efficiency of the backlight module.

Also, with reference to FIGS. 2, 4, and 5, the backplate 10 has a frame 12 disposed on an edge of the carrying surface 11, and preferably on an edge of the carrying surface 11 in the abutting direction D1. The position-limiting unit 20 abuts against the frame 12, and the extending portion 35 is spaced from the frame 12. The position-limiting unit 20 is configured to be fixed and positioned by abutting against the frame 12, which improves efficiency of position-limiting. When the extending portion 35 extends toward the frame 12 due to the expansion of the reflective sheet 30, a space between the extending portion 35 and the frame 12 prevents the extending portion 35 and the frame 12 from contact. Deformation of the light-emitting surface of the reflective sheet 30 due to compression can thus be prevented, and the optical quality of the backlight module can be guaranteed. Specifically, the position-limiting unit 20 is made of an elastic material, is formed in one piece, and has a carrying portion 25 and a side wall 26 connected to each other. The carrying portion 25 is disposed on the carrying surface 11, and the reflective sheet 30 is located on the carrying portion 25. The side wall 26 is basically disposed on a side of the carrying portion 25 in the abutting direction D1 and abuts against the frame 12. The position-limiting surface 21, the guiding surface 22, and the arc section 24 are formed on a bottom side of the side wall 26, and the gap 23 is formed between the carrying portion 25 and the side wall 26.

Preferably, with reference to FIGS. 1, 5, and 6, the position-limiting unit 20 is disposed at a corner of the backplate 10 and on a side of the light guiding plate 40 away from the light-emitting unit 50. By having said position-limiting unit 20 disposed at each one of two corners of the backplate 10, the position of the reflective sheet 30 can be effectively limited. Also, the light-emitting surface of the backlight module is not interfered by said position-limiting unit 20. The extending portion 35 is located between two said position-limiting units 20 and has no contact with the said position-limiting unit 20. In addition, the backplate 10 has a positioning groove 13. The positioning groove 13 is adjacent to the frame 12 and is recessed on the carrying surface 11. Said position-limiting unit 20 is disposed in the positioning groove 13, which improves efficiency of fixing said position-limiting unit 20 and convenience of mounting said position-limiting unit 20.

With reference to FIGS. 4 to 6, the reflective sheet 30 has a recess portion 36 recessed inward from the second side edge 32 toward the cutting line 33. The recess portion 36 and the cutting line 33 are respectively located on two opposite sides of the bendable portion 34. By the recess portion 36, structural rigidity of the bendable portion 34 on the second side edge 32 is reduced to increase flexibility of the bendable portion 34, so the bendable portion 34 can be pressed and bend more easily. Also, rigidity of a pressed part on the bendable portion 34 is maintained, so the bendable portion 34 can surely be pressed into the gap 23 of the position-limiting unit 20. Further, the recess portion 36 may be formed in different shapes. E.g., the recess portion 36 may be recessed inward to be arc-shaped or V-shaped or may be a through hole formed on the second side edge 32 as long as the structural rigidity on the second side edge 32 is reduced. In the preferred embodiment, the recess portion 36 is arc-shaped such that a bending section on the bendable portion 34 has a consistent bending angle along the abutting direction D1. The bendable portion 34 can thus be pressed and extend into the gap 23 more easily.

Furthermore, with reference to FIGS. 1 and 4, the reflective sheet 30 has a main portion 37, and an area defined by the main portion 37 is a visible area of the backlight module. The cutting line 33 extends from the first side edge 31, toward a middle of the reflective sheet 30, and to an edge of the main portion 37. The bendable portion 34 and the main portion 37 are connected to each other, and the recess portion 36 is located outside the main portion 37. The cutting line 33, the recess portion 36, and the bendable portion 34 are all located outside the visible area of the backlight module and thus prevented from interfering with optical efficiency of the visible area. Also, since the recess portion 36 is closer to the main portion 37 than the first side edge 31, the bendable portion 34 can be guided by the guiding surface 22 more easily.

In addition, the cutting line 33 may or may not extend along the abutting direction D1. In the preferred embodiment, the cutting line 33 extends along the abutting direction D1 to ensure where the bendable portion 34 and the main portion 37 are connected to have a sufficient width. The bendable portion 34 thus has a sufficient structural rigidity. When the reflective sheet 30 expands, the bendable portion 34 can be pressed and surely extend into the gap 23 to prevent the main portion 37 from deforming. If the cutting line 33 does not extend along the abutting direction D1, the above-mentioned efficiency of the present invention may still be achieved as long as the cutting line 33 extends an enough distance for the bendable portion 34 to bend relative to the main portion 37.

Figure 7:
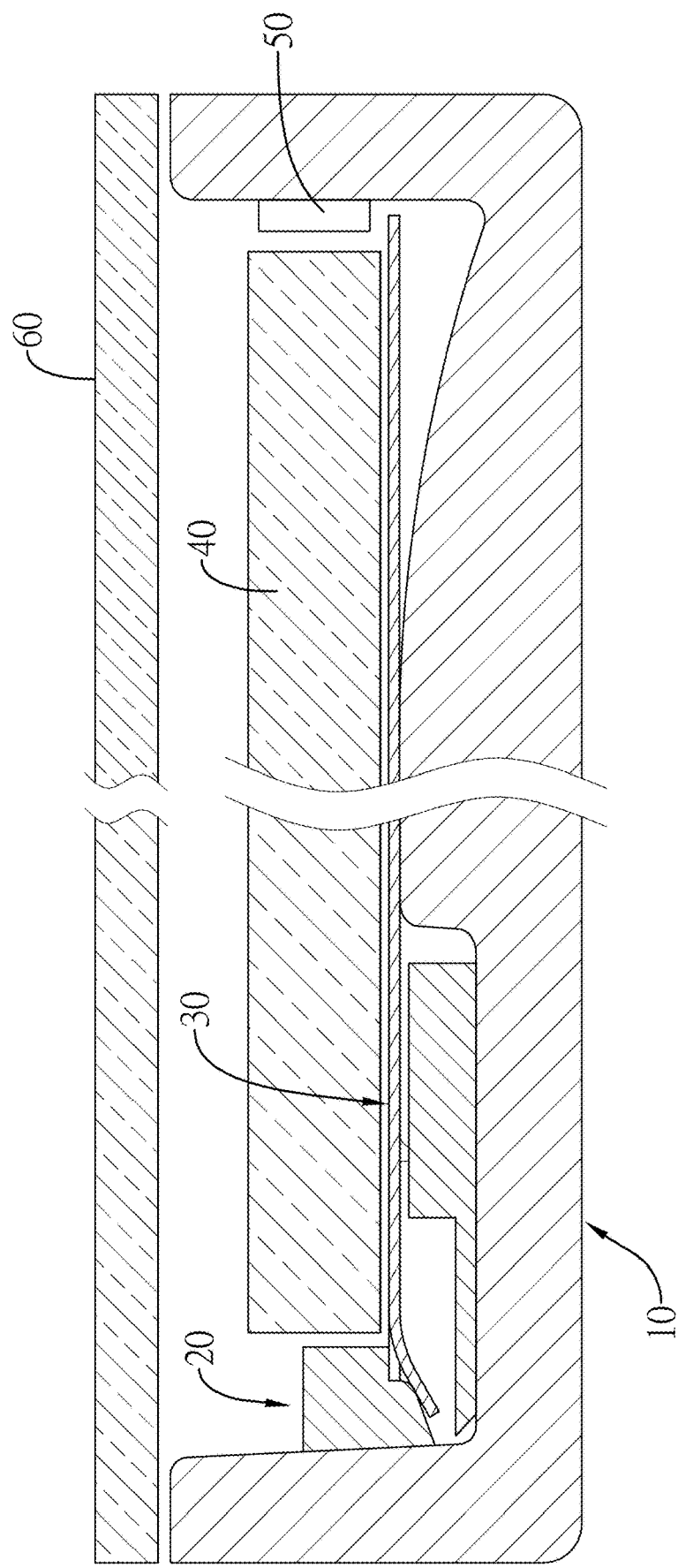
FIG. 7 is a partial sectional side view of a preferred embodiment of a display device in accordance with the present invention.

With reference to FIG. 7, a preferred embodiment of a display device in accordance with the present invention has the aforementioned backlight module and a display panel 60. The display panel 60 is disposed on a side of the light guiding plate 40 away from the backplate 10, and the backlight module is configured to emit light toward the display panel 60.

Applied with the above-mentioned backlight module, the display device in accordance with the present invention accommodates expansion or contraction of the reflective sheet 30, maintains its efficiency of position-limiting, and prevents its optical quality from being harmed by expansion or shifting of the reflective sheet 30. Thereby, the display device may maintain great optical quality, prevent optical loss, and be applicable in in-vehicle devices applied with side-type backlight module.

To conclude, by the match of the reflective sheet 30 and the position-limiting unit 20 of the backlight module, the bendable portion 34 is configured to bend and be guided by the guided surface 22 to extend into the gap 23 when the reflective sheet 30 expands. Not only deformation of the reflective sheet 30 but also shifting of the end of the reflective sheet 30 near the light-emitting unit can be prevented. Thereby, the backlight module ensures its optical quality and optical stability and prevents optical loss.

What is claimed is:

1. A backlight module having an abutting direction and comprising:
    a backplate having a carrying surface;
    a position-limiting unit disposed on the carrying surface of the backplate and having
        a position-limiting surface and a guiding surface connected with each other; and
        a gap being adjacent to the guiding surface;
    a reflective sheet disposed on the carrying surface of the backplate and having
        a first side edge;
        a second side edge;
        a cutting line extending inward from the first side edge; and
        a bendable portion formed between the second side edge and the cutting line and abutting against the position-limiting surface of the position-limiting unit;

a light guiding plate disposed on the reflective sheet; and
a light-emitting unit disposed on a side of the light guiding plate; wherein
the bendable portion of the reflective sheet extends into the gap of the position-limiting unit along the guiding surface of the position-limiting unit as the reflective sheet expands along the abutting direction; and
the position-limiting unit is disposed at a corner of the backplate and on a side of the light guiding plate away from the light-emitting unit.

2. A display device comprising:
the backlight module as claimed in claim 1; and
a display panel disposed on a side of the light guiding plate away from the backplate.

3. The backlight module as claimed in claim 1, wherein the cutting line is parallel to the abutting direction.

4. The backlight module as claimed in claim 1, wherein the cutting line is located outside and near the position-limiting unit.

5. The backlight module as claimed in claim 1, wherein the position-limiting surface and the guiding surface are connected via an arc section.

6. The backlight module as claimed in claim 1, wherein the reflective sheet has an extending portion connected to the first side edge of the reflective sheet;
the cutting line is formed between the bendable portion and the extending portion; and
the extending portion and the position-limiting unit have no contact with each other.

7. The backlight module as claimed in claim 6, wherein the backplate has a frame disposed on an edge of the carrying surface;
the position-limiting unit abuts the frame; and
the extending portion is spaced from the frame.

8. The backlight module as claimed in claim 1, wherein the reflective sheet has a recess portion recessed from the second side edge toward the cutting line; and
the recess portion and the cutting line are respectively located on two sides of the bendable portion.

9. The backlight module as claimed in claim 8, wherein the reflective sheet has a main portion connected to the bendable portion; the cutting line extends from the first side edge, toward a middle of the reflective sheet, and to an edge of the main portion; and
the recess portion is located outside the main portion.

10. A backlight module having an abutting direction and comprising:
a backplate having a carrying surface;
a position-limiting unit disposed on the carrying surface of the backplate and having
a position-limiting surface and a guiding surface connected with each other; and
a gap being adjacent to the guiding surface;
a reflective sheet disposed on the carrying surface of the backplate and having
a first side edge;
a second side edge;
a cutting line extending inward from the first side edge; and
a bendable portion formed between the second side edge and the cutting line and abutting against the position-limiting surface of the position-limiting unit;
a light guiding plate disposed on the reflective sheet; and
a light-emitting unit disposed on a side of the light guiding plate;
wherein
the bendable portion of the reflective sheet extends into the gap of the position-limiting unit along the guiding surface of the position-limiting unit as the reflective sheet expands along the abutting direction; and the position-limiting surface and the guiding surface are connected via an arc section.

11. A display device comprising:
the backlight module as claimed in claim 10; and
a display panel disposed on a side of the light guiding plate away from the backplate.

\* \* \* \* \*